United States Patent
Howard

(10) Patent No.: US 6,575,709 B2
(45) Date of Patent: Jun. 10, 2003

(54) PUMPS

(75) Inventor: Rodney Stuart Howard, Hemel Hempstead (GB)

(73) Assignee: Goodrich Control Systems, Luton (GB)

( * ) Notice: Subject to any disclaimer, the term of this patent is extended or adjusted under 35 U.S.C. 154(b) by 152 days.

(21) Appl. No.: 09/894,703

(22) Filed: Jun. 28, 2001

(65) Prior Publication Data

US 2002/0001526 A1 Jan. 3, 2002

(51) Int. Cl.[7] .............................. F04B 49/00
(52) U.S. Cl. ........................ 417/286; 417/216
(58) Field of Search ................ 417/286, 216, 417/287, 319, 426, 429

(56) References Cited

U.S. PATENT DOCUMENTS 4,534,271 A * 8/1985 Forster ..................... 91/472
5,800,134 A * 9/1998 Hasegawa et al. ........... 417/269
5,957,666 A * 9/1999 Lee ............................ 417/269
6,022,198 A * 2/2000 Hoffmeister ................. 417/203
6,361,282 B1 * 3/2002 Wanschura .................. 417/206
6,494,686 B1 * 12/2002 Ward ........................ 417/199.1

FOREIGN PATENT DOCUMENTS

EP   1166841 A2 * 1/2002 ........... B01D/19/00
EP   1167706 A1 * 1/2002 ........... F01M/11/06
EP   1167859 A2 * 1/2002 ........... F16N/7/38

* cited by examiner

Primary Examiner—Teresa Walberg
Assistant Examiner—Vinod D. Patel
(74) Attorney, Agent, or Firm—Reising, Ethington, Barnes, Kisselle and Learman, P.C.

(57) ABSTRACT

A pump system is provided where low pressure (4) and high pressure (6) pumps are coaxially mounted to receive motive power from a shared drive (300). The drive shafts are arranged such that one extends within a void in the other and both have shear regions such that, in the event of torque overload, either shaft can shear so as to disconnect the drive to it's associated pump while the other pump and shaft can continue to work.

11 Claims, 4 Drawing Sheets

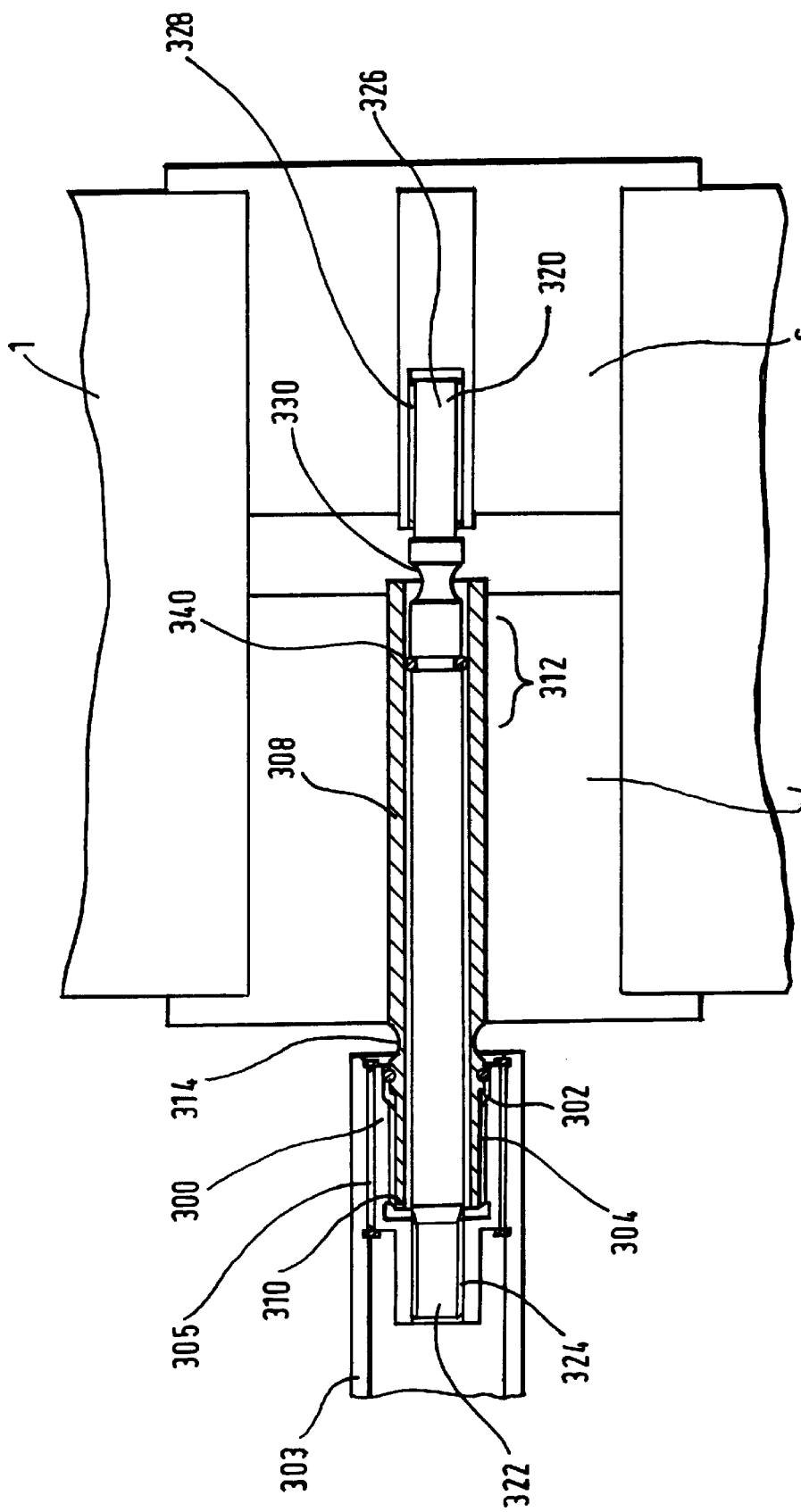

PUMPS

TECHNICAL FIELD

The present invention relates to a pump system, and to a lubrication and hydraulic control system including such pumps.

BACKGROUND OF THE INVENTION

Oil within a single machine may be used for many purposes. In the context of a constant speed generator for use within an aircraft electrical power generation system, the oil may be used to lubricate bearings and other rotating parts, to act as a coolant within the generator, and may also act as a control fluid within a speed conversion system, such as a continuously variable transmission, used to ensure that a variable input speed from a prime mover is converted to a near constant generator speed. Use of oil as a coolant generally requires a high volume low pressure supply of oil. However, use of oil as a control fluid generally requires a high pressure supply of oil.

There is a penalty to be paid, in terms of energy consumed by the pumps and heat dumped into the oil, in pumping oil to high pressure. For this reason it is not desirable to use a single pump to supply oil at high pressure and high volume with the intention of tapping some of this oil off to a lower pressure for use as a coolant. Furthermore, high pressure pumps inevitably work under more stress than low pressure pumps and tend to require more frequent servicing and/or have shorter service lives.

SUMMARY OF THE INVENTION

According to a first aspect of the present invention, there is provided a pump system comprising a first pump for providing a first flow of liquid for use within a cooling or lubrication system, and a second pump for providing a second flow of liquid, wherein the pumps are drivingly connected via respective coupling elements to an input element, and arranged such that failure of the second pump resulting in it requiring an increased torque at an input to the pump causes the second pump to be drivingly disconnected from the input element.

Preferably the second pump is arranged to supply liquid for use in a control system. The second pump may, for example, be arranged to supply oil for use in hydraulic actuators associated with a continuously variable transmission system. Such a system, may for example, comprise a drive belt running between two continuously variable ratio pulleys. Preferably the first and second pumps are coaxially mounted. The drive for the second pump may be provided via the first pump.

In a preferred arrangement, the first pump is driven via a first pump drive shaft and the second pump is driven via a second pump drive shaft which is coaxial with the first pump drive shaft. The first pump drive shaft and the second pump drive shaft advantageously have drive regions which receive a driving torque to be transmitted via the drive shafts and pump regions which engage with the pumps or suitable intermediate elements such that torque can be transferred from the shafts to the pumps. Each shaft also has a shear region, for example in the form of a shear neck, located between the drive region and the pump region thereof such that in the event of excessive torque being transmitted through either shaft, that shaft can shear, so as to provide protection against mechanical failure in the associated pump, while the remaining shaft continues to transmit drive to its associated pump.

Advantageously the first and second pump drive shafts are attached to a shared drive region.

Preferably the second pump is in splined engagement, via a coupling, with a drive shaft supplying motive power to it.

Preferably the second pump is attached to a mounting point such that the fixing points for the second pump do not require disassembly or substantial disassembly of the housing containing the machine serviced by the pump. Advantageously the fixing points are on an external wall of the housing. Thus the high pressure pump may be implemented as a unit removable and replaceable from the exterior of the housing. The use of the splined coupling means that disconnection of the pump from its drive and reconnection to the drive can be achieved merely by an axial movement of the second pump.

It is thus possible to provide a pump system for a continuously variable transmission and generator within a housing, wherein a low pressure pump is provided for supplying oil for lubrication and cooling components within the continuously variable transmission and generator and a high pressure pump is provided for supplying high pressure oil to control actuators of the continuously variable transmission, and wherein failure or damage of the high pressure pump causes it to become drivingly disconnected thereby leaving the low pressure pump continuing to operate in order that it can maintain a supply of coolant to components within the housing. In this event, the continuously variable transmission defaults to minimum generator drive speed.

It is further possible to provide a pump mounted to a fixing on the external surface of the housing containing the pump, with said pump being connected to a drive element via a coupling which allows the pump to be disconnected from the element by an axial movement in the first direction and connected to the drive element by an axial movement in a second direction opposed to the first direction, and wherein the coupling has a disconnect region therein designed to drivingly disconnect the pump when the torque acting on the coupling exceeds a predetermined value. Alternatively the pump may be mounted in a recess accessible either directly from the external surface of the housing or easily accessible via the removal on an element such as a plate.

BRIEF DESCRIPTION OF THE DRAWINGS

The present invention will further be described, by way of example, with reference to the accompanying drawings, in which:

FIG. 4 shows a further arrangement of pumps constituting an embodiment of the present invention.

DETAILED DESCRIPTION

Figure 1:
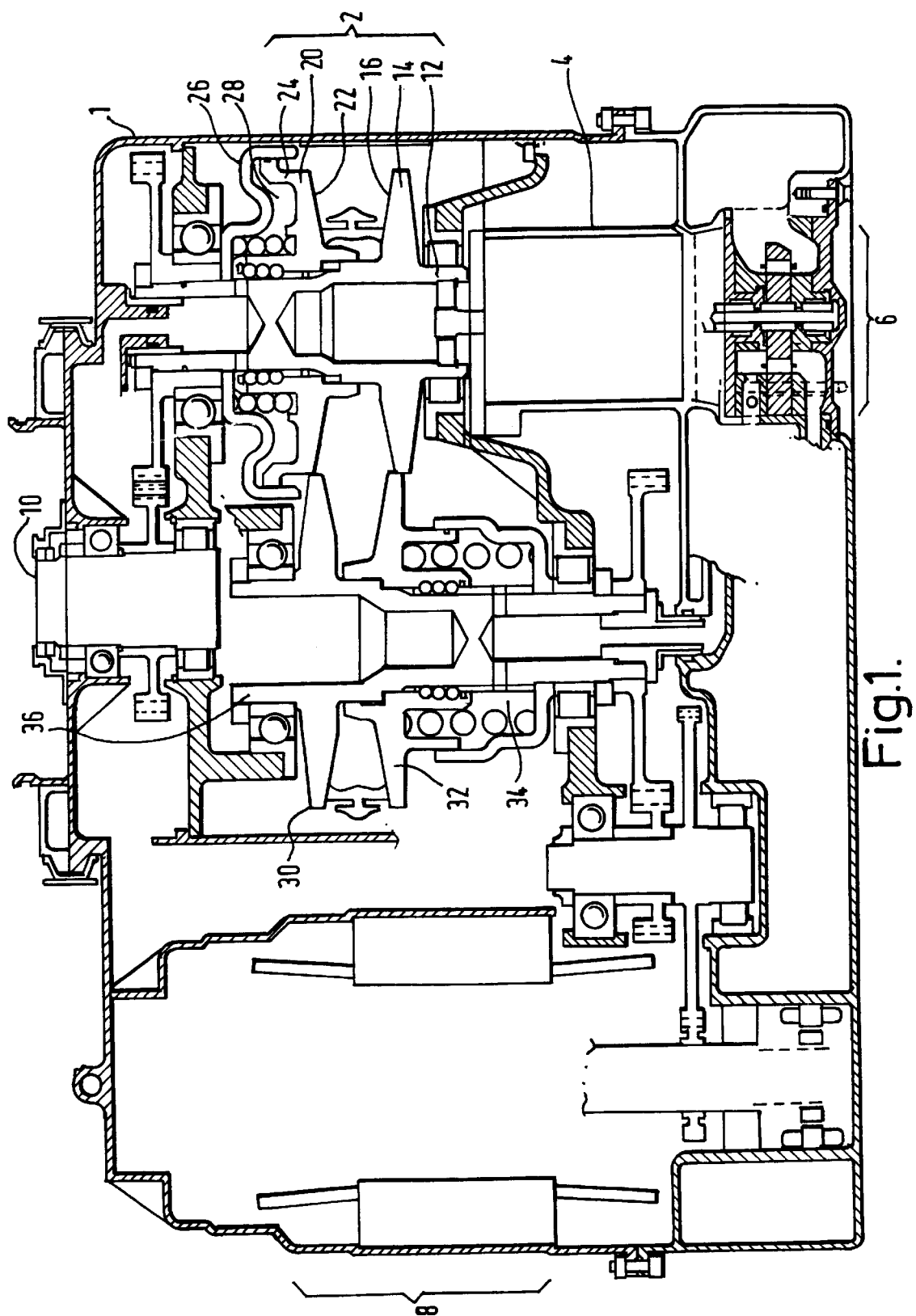
FIG. 1 is a schematic cross section through a constant speed generator for use in an avionics environment.

The generator shown in FIG. 1 comprises a housing 1 which encloses a continuously variable transmission generally designated 2 utilising a belt drive, a low pressure pump 4, a high pressure pump 6, a generator, generally designated 8, and an oil system disposed throughout the housing 1.

The belt drive 2 enables the variable speed of an input shaft 10 which receives a drive from a spool of a gas turbine engine to be converted to a near constant speed such that the generator 8 can be run at a near constant speed. In order to do this, a first shaft 12 of the belt drive mechanism carries a flange 14 which defines an inclined surface 16 against which a drive belt bears. The shaft 12 also carries a coaxially disposed movable flange 20 drivingly connected to the shaft 12 via a splined portion (not shown). The movable flange 20 defines a further inclined surface 22 facing towards the surface 16, which surfaces serve to define a V-shaped channel whose width can be varied by changing the axial position of the flange 20 with respect to the fixed flange 14. The flange 20 has a circularly symmetric wall 24 extending towards and co-operating with a generally cup shaped element 26 carried on the shaft 12 to define a first hydraulic chamber 28 therebetween which is in fluid flow communication via a control duct (not shown) with an associated control valve. Similarly, a fixed flange 30 and a movable flange 32 are associated with a second shaft 36 and associated with a second hydraulic control chamber 34. A steel segmented belt having a cross-section in the form of a trapezium, with the outer most surface being wider than the inner most surface is used to interconnect the first and second variable ratio pulleys formed between the pairs of fixed and movable flanges, respectively, in order to drivingly connect the flanges.

The position of each movable flange with respect to the associated fixed flange is controlled by the hydraulic actuators. Since the interconnecting belt is of a fixed width, moving the flanges closer together forces the belt to take a path of increased radial distance. The interconnecting belt has a fixed length, and consequently as one movable flange is moved towards its associated fixed flange, the other movable flange must move away from its associated fixed flange in order to ensure that the path from an arbitrary starting point, around one of the pulleys, to the second pulley, around the second pulley and back to the fixed arbitrary starting point remains a constant distance. The compressive forces exerted on the belt in order to ensure that the belt does not slip with respect to the pulleys can be large, and this in turn requires the high pressure pump to supply oil at a pressure of around 100 bar.

Figure 2:
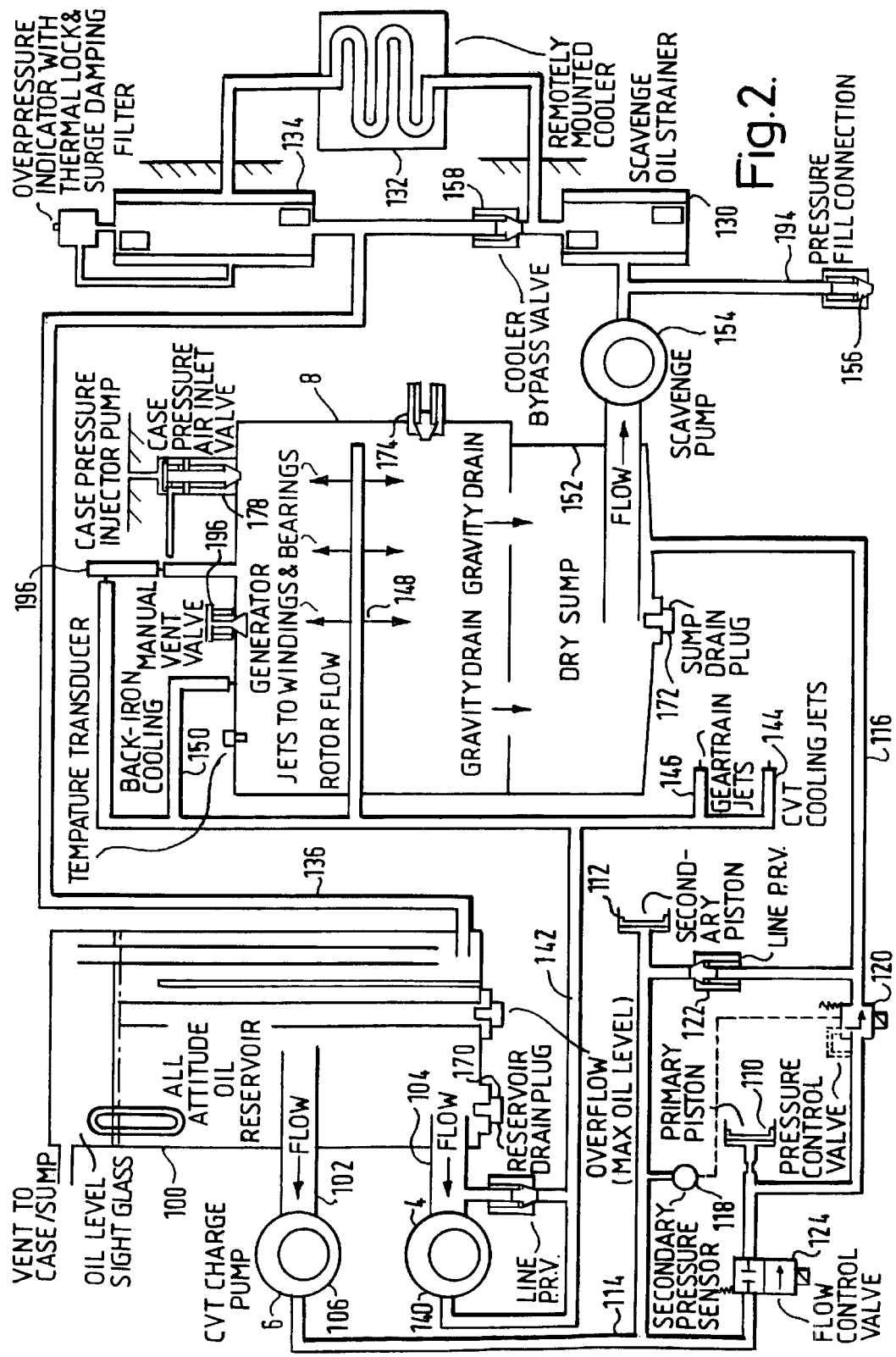
FIG. 2 is a schematic diagram of the oil system of the generator shown in FIG. 1.

FIG. 2 schematically illustrates the oil system within the power generation system. An oil reservoir 100 acts to contain de-aerated oil. The reservoir has a first outlet 102 connected to an inlet of the high pressure pump 6 and a second outlet 104 connected to an inlet of the low pressure pump 4. An outlet 106 of the high pressure pump 6 provides oil which is ducted towards a primary piston 110 formed by movable flange 20 and the cup shaped element 26 (FIG. 1) thereby defining the first hydraulic control chamber 28, and a secondary piston 112 (similar to the primary piston) which contains the second hydraulic control chamber 34. As shown in FIG. 2, both the primary piston 110 and the secondary piston 112 can be regarded as being connected between a high pressure supply line 114 and a low pressure return line 116. The pressure in the high pressure line 114 is measured by a pressure sensor 118 and supplied to a controller (not shown). The controller uses a measurement of oil pressure, aero-engine drive speed and/or generator speed and electrical demand to schedule and/or control the hydraulic pressure acting in the primary and secondary pistons. The secondary piston 112 is connected directly to the high pressure line 114. However, the pressure within the high pressure line 114 can be controlled by spilling pressurised lubricant from the high pressure line 114 to the low pressure return line 116 via an electrically controlled pressure control valve 120 connected between the high pressure and low pressure lines, respectively. Thus in order to increase the hydraulic pressure within the secondary piston 112, the pressure control valve 120 is moved to restrict flow therethrough, and in order to release pressure within the secondary piston, the pressure control valve 120 is opened. A normally closed pressure return valve 122 is connected between the fluid port to the secondary piston 112 and the low pressure return line 116. The valve 122 is normally closed, but is set to open at a predetermined pressure in order to protect the hydraulic system in the event of system over pressure.

The primary piston 110 receives high pressure fluid from the high pressure line 114 via an electrically operated flow control valve 124. The valve 124 is in series with the pressure control valve 120 between the high pressure line 114 and the low pressure line 116, and the primary piston 110 is connected to the node between these valves. This configuration of valves means that the pressure control valve 120 can be used to simultaneously increase the pressure in both the primary and secondary pistons in order to prevent belt slippage, whereas the balance of flow rates through the control valve 124 and the pressure control valve 120 sets the relative positions of the primary and secondary pistons. Oil from the low pressure line 116 is returned to the sump 152.

An outlet 140 of the low pressure pump 4 supplies oil via supply line 142 to oil cooling jets 144 for spraying oil onto the moving parts of the continuously variable transmission, to jets 146 for spraying oil onto the gear train interconnecting the transmission to the generator, to jets 148 for lubricating the windings and bearings within the generator and also along a cooling path 150 for cooling the stator within the generator.

The generator 8 has a gravity drain to a dry sump 152. Oil collecting in the sump 152 is pumped out of the sump by a single scavenge pump 154. The output line from the scavenge pump connects with the low pressure return line 136 via an oil strainer 130, a remotely mounted oil cooler 132 and an oil filter 134. A pressure fill connector 156 is in fluid flow communication with the low pressure return line 194 in order to allow the oil system to be filled. An oil cooler by-pass valve 158 is connected between the output from the strainer 130 and the line 136 in order to by-pass the oil cooler and oil filter during cold start or in the event of cooler, filter or external line blockage. The oil by-pass valve is normally closed and set to open at a predetermined over pressure.

In order to drain the system, a drain plug 170 is provided in the reservoir, similarly a drain plug 172 is provided for the sump and a pressure operated vent valve 174 is provided in the generator in order to relieve the excess pressure occurring within the generator. A manually operated vent valve 176 is provided to vent pressure from the generator. An automatic air inlet valve 178 is provided to allow air to enter the generator via an injector pump 196 to provide positive internal pressure.

Figure 3:
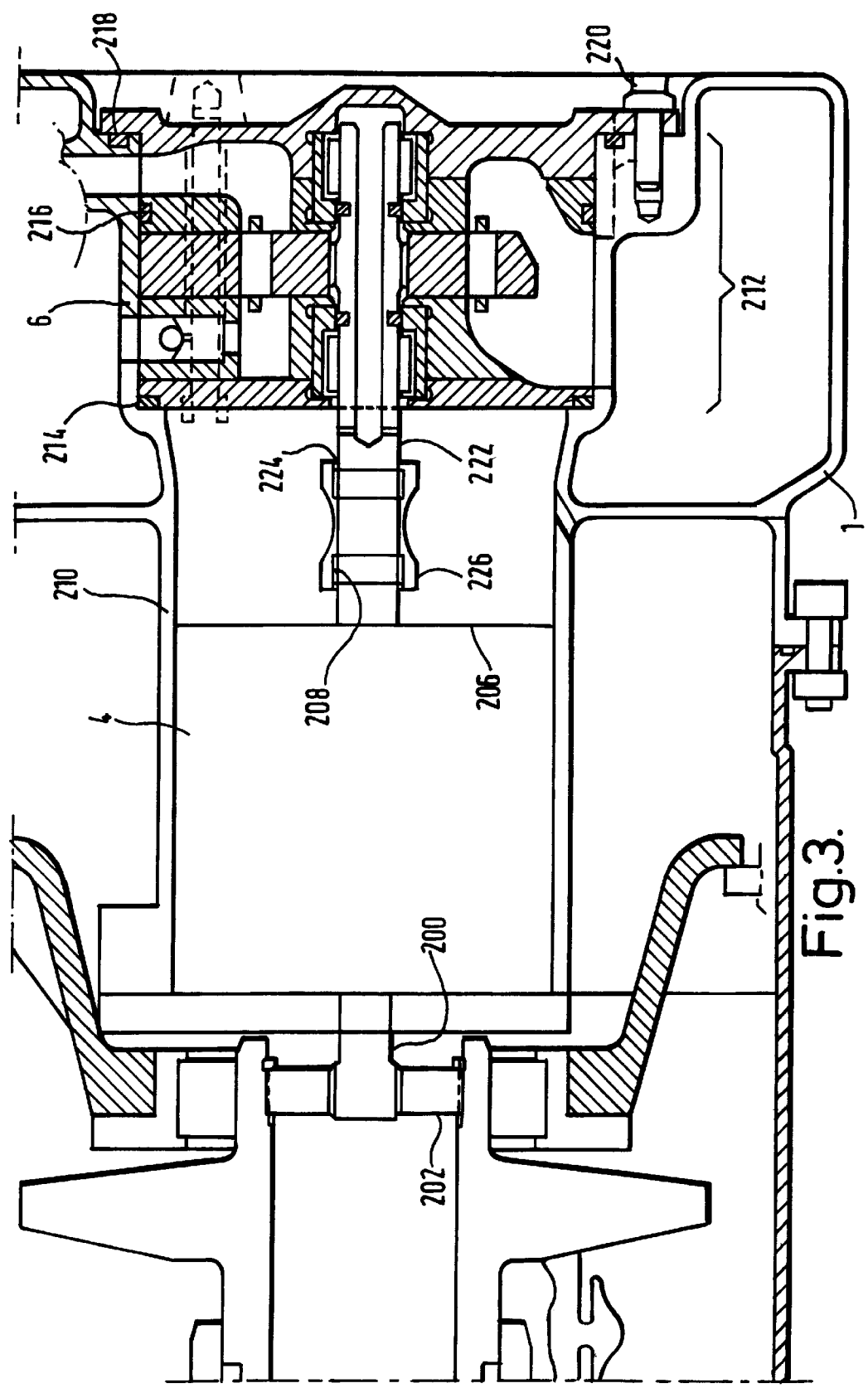
FIG. 3 shows the physical arrangement of the low pressure and high pressure pumps in greater detail.

FIG. 3 schematically shows the arrangement of the low pressure and high pressure pumps 4 and 6, respectively, in greater detail. An input shaft 200 of the low pressure pump 4 has a splined portion which engages with an end plate 202 carried on and drivingly connected to the first shaft 12. The end plate 202 has an axially disposed splined aperture. The constructional details of the low pressure pump 4 are not important, save for the fact that the input shaft 200 extends through a rear wall 206 of the low pressure pump 4 and terminates in a splined portion 208. The low pressure pump 4 is secured to internal support structures, such as internal walls 210 within the housing 1.

The high pressure pump 6 is constructed as a removable pump unit. The walls 210 of the housing are shaped so as to form a reception region, generally indicated 212, into which the high pressure pump 6 can fit in a sliding fit with the walls 210. The precise constructional details of the high pressure pump are not important, save for the fact that seals, for example ring seals 214, 216 and 218 are provided to interface between the body of the pump 6 and the walls 210 in order to form a fluid sealed engagement. Pump inlet and delivery apertures formed in the body of the pump 6 align with corresponding apertures formed in the reception region 212. The pump 6 has an outwardly facing end plate which carries a flange or other attachment regions through which bolt holes extend such that a plurality of bolts 220 (of which only one is shown) can be used to secure the pump 6 to the housing 1.

An input shaft 222 of the pump 6 extends towards and is coaxially aligned with the portion of the shaft 200 extending from the rear wall of the low pressure pump 4. The shaft 222 also carries a splined portion 224. A generally cylindrical connector 226 is provided to mechanically interconnect the shaft 222 to the shaft 200. The connector 226 has an internal bore of a first radius which increases to a larger radius towards the ends thereof where internally facing splines are formed. Thus once the connector 226 is positioned between the shafts 200 and 222, as shown in FIG. 3, it is prevented from undergoing axial displacement along the shafts. The connector 226 has a thinned region forming a waist. The wall thickness in the waist region is selected such that the coupling shears when the torque transmitted through it exceeds a predetermined value. This value is selected as the maximum operating torque of the high pressure pump plus a suitable tolerance margin.

In use, rotation of the shaft 12 is transmitted to the low pressure pump such that the pump provides a flow of cooling and lubricating oil. Rotation of the shaft 12 is also transmitted to the high pressure pump via the shaft 200 and the coupling 226. Thus the high pressure pump can supply high pressure fluid for operating the actuators. However, given that the high pressure pump is more highly stressed and consequently bears an increased risk of unexpected failure, the coupling is selected such that, should the high pressure pump seize, the increased torque transmitted through the coupling 226 will cause it to fail thereby disconnecting the drive to the high pressure pump. This will cause loss of clamp pressure control and consequently the generator will have to be shut down. Nevertheless, the continued flow of cooling and lubricating oil via the low pressure pump 4 will ensure that the generator and gear box assembly does not become damaged as a result of high pressure pump failure and the resulting unscheduled shutdown.

Once the aircraft has returned to the ground, or during a planned maintenance schedule, the high pressure pump can be quickly and easily replaced by undoing the bolts 220 and removing the complete assembly from the generator. A replacement high pressure pump can then be refitted, as can a replacement coupling 226.

FIG. 4 schematically illustrates a further arrangement of the low pressure and high pressure pumps 4 and 6. A drive shaft 303 has a recess formed in the end portion thereof which carries inwardly facing internal splines 305. A common drive element 300 has a first region which carries outwardly extending splines which interengage with the inwardly extending splines 305 of the shaft 303. The common drive element 300 has a recess 302 formed in the end portion thereof which carries inwardly facing internal splines 304. A low pressure pump drive shaft 308 has a first region 310 which carries outwardly facing splines which inter-engage with the inwardly facing splines 304 of the drive element 300. The low pressure pump drive shaft the extends towards the low pressure pump 4 passing through a central bore thereof and drivingly engaging with the low pressure pump 4, for example by further splines at a pump engagement region 312. A sheer neck 314 is disposed intermediate the regions 310 and 312 in order to define a region of the shaft which will sheer when the torque acting thereon exceeds a predetermined load.

The low pressure pump drive shaft is hollow. This enables a high pressure pump drive shaft 320 to extend from the common drive element 300 via the central bore of the low pressure pump drive shaft 308 towards the high pressure pump 6. The high pressure pump drive shaft has a first end 322 which carries outwardly facing splines 324 which engage with co-operating splines carried on the drive element 300. Similarly, a second end 326 of the high pressure pump drive shaft 320 carries outwardly facing splines which engage with co-operating splines (not shown) to drivingly engage with the high pressure pump 6. A shear region 330, for example in the form of a sheer neck is exposed intermediate the first and second regions 322 and 326, respectively.

It can be seen that both the low pressure pump and high pressure pump effectively are commonly connected to the drive element 300, and drive shaft 303, which provides to motive power to drive the pumps.

In the event of mechanical failure of the high pressure pump, resulting in an excess torque being transferred along the high pressure pump drive shaft 320, then the sheer neck 330 will fail thereby causing the drive to the high pressure pump to be removed. Under these conditions, the low pressure pump 4 can still receive drive via its respective low pressure pump drive shaft 308. However, in the event that mechanical failure occurs in the low pressure pump, resulting in excess torque being transmitted along the low pressure pump drive shaft 308, then this can fail at the sheer neck 314 thereby disconnecting the low pressure pump. Under these circumstances, drive can still be supplied to the high pressure pump. Thus, failure of either pump still allows drive to be supplied to the other pump. This allows a controlled shutdown to be performed in the event of failure of either pump.

The low pressure pump drive shaft and high pressure pump drive shaft should remain coaxially disposed with respect to one another by virtue of being supported either by their respective pumps, or by the drive element 300. However, in order to ensure that the shafts remain coaxially disposed, one or more O ring seals 340 may be used to hold the shafts in a spaced apart configuration.

It is thus possible to provide a pump arrangement where failure of the high pressure pump can be tolerated, and replacement of the high pressure pump is facilitated through constructional details of the pumps and housing. This gives reduced running costs, and also due to the ease of removal and inspection of the high pressure pump, also means that the task of servicing or replacing the high pressure pump becomes much easier and quicker and consequently is likely to be performed more often by operators compared to situations where they would have to demount the entire gear box and split its casing open.

What is claimed is:

1. A pump system comprising a first pump for providing a first flow of liquid for use within a cooling lubricant system, and a second pump for providing a second flow of liquid, wherein the pumps are drivingly connected via respective coupling elements and arranged such that failure of the second pump resulting in it requiring an increased torque at an input to the second pump causes the second pump to be drivingly disconnected from an input element.

2. A pump system as claimed in claim 1, in which the first and second pumps are coaxially mounted.

3. A pump system as claimed in claim 1, in which the first pump is driven via a first pump drive shaft and the second pump is driven via a second pump drive shaft, which is coaxial with the first pump drive shaft.

4. A pump system as claimed in claim 3, in which each of the first and second pump drive shafts have shear regions formed therein such that in the event of torque above respective predetermined thresholds, either of the first and second drive shafts can shear while the other continues to transmit torque.

5. A pump system as claimed in claim 3, in which one of the first and second pump drive shafts extends within the other one of the first and second pump drive shafts.

6. A pump system as claimed in claim 1, in which the first and second pump drive shafts are attached to a shared drive.

7. A pump system as claimed in claim 1, in which the drive for the second pump is via the first pump.

8. A pump system as claimed in claim 1, in which the second pump is in splined engagement with the second pump drive shaft.

9. A pump system as claimed in claim 1, in which the second pump is attached to a mounting point such that the fixing points for the second pump are accessible without requiring disassembling or substantial disassembly of a housing containing a machine serviced by the second pump.

10. A pump system as claimed in claim 9, in which the fixing points for the second pump are on an external wall of the housing.

11. An aeronautical constant speed generator assembly including a pump system as claimed in claim 1.

* * * * *

UNITED STATES PATENT AND TRADEMARK OFFICE
CERTIFICATE OF CORRECTION

PATENT NO. : 6,575,709 B2  Page 1 of 1
DATED : June 10, 2003
INVENTOR(S) : Rodney Stuart Howard It is certified that error appears in the above-identified patent and that said Letters Patent is hereby corrected as shown below:

<u>Title page,</u>
Below Item [65], insert Item [30] therein:
-- [30] Foreign Application Priority Data
June 30, 2000 (GB) …….. 0016193.5 --

Signed and Sealed this

Third Day of February, 2004

JON W. DUDAS
*Acting Director of the United States Patent and Trademark Office*